United States Patent [19]

Bierhoff et al.

[11] 4,236,173

[45] Nov. 25, 1980

[54] APPARATUS FOR READING A DISC-SHAPED RECORD CARRIER HAVING A PAL COLOR TELEVISION SIGNAL

[75] Inventors: Martinus P. M. Bierhoff; Adrianus H. Hoogendijk, both of Eindhoven, Netherlands

[73] Assignee: U.S. Philips Corporation, New York, N.Y.

[21] Appl. No.: 7,856

[22] Filed: Jan. 31, 1979

[30] Foreign Application Priority Data

Oct. 13, 1978 [NL] Netherlands .................. 7810298

[51] Int. Cl.³ .................................. H04N 5/795
[52] U.S. Cl. ......................................... 358/8
[58] Field of Search ............... 358/8, 128, 24, 37; 360/10, 11

[56] References Cited

U.S. PATENT DOCUMENTS

| Re. 29,963 | 4/1979 | Janssen | 358/128 |
|---|---|---|---|
| 3,854,015 | 12/1974 | Janssen | 358/128 X |
| 4,057,827 | 11/1977 | Hoogendijk | 358/8 |
| 4,057,832 | 11/1977 | Kappert | 358/128 |
| 4,090,218 | 5/1978 | van Buul et al. | 358/128 X |

Primary Examiner—Bernard Konick
Assistant Examiner—Donald McElheny, Jr.
Attorney, Agent, or Firm—Thomas A. Briody; William J. Streeter; Simon L. Cohen

[57] ABSTRACT

An apparatus for reading a disc-shaped record carrier on which per track circumference one picture of a color television signal is recorded. The signal being read is converted to a standard PAL color television signal. The apparatus comprising a command device which by applying command signals to control means can produce a jumpwise radial change in the scanning position on the record carrier, so as to enable the scanning sequence of the recorded pictures to be changed. In order to maintain a standard PAL color television signal in the case of a changed scanning sequence, the apparatus comprises a correction device for the chrominance signal. This correction device is controlled by the command device and comprises a mixing circuit for mixing the chrominance signal with a reference signal of twice the chrominance subcarrier frequency during time intervals prescribed by the command device, and phase correction means for introducing a phase shift of 0°, 90°, 180°, or 270° in the chrominance signal in accordance with a pattern defined by the command device.

3 Claims, 5 Drawing Figures

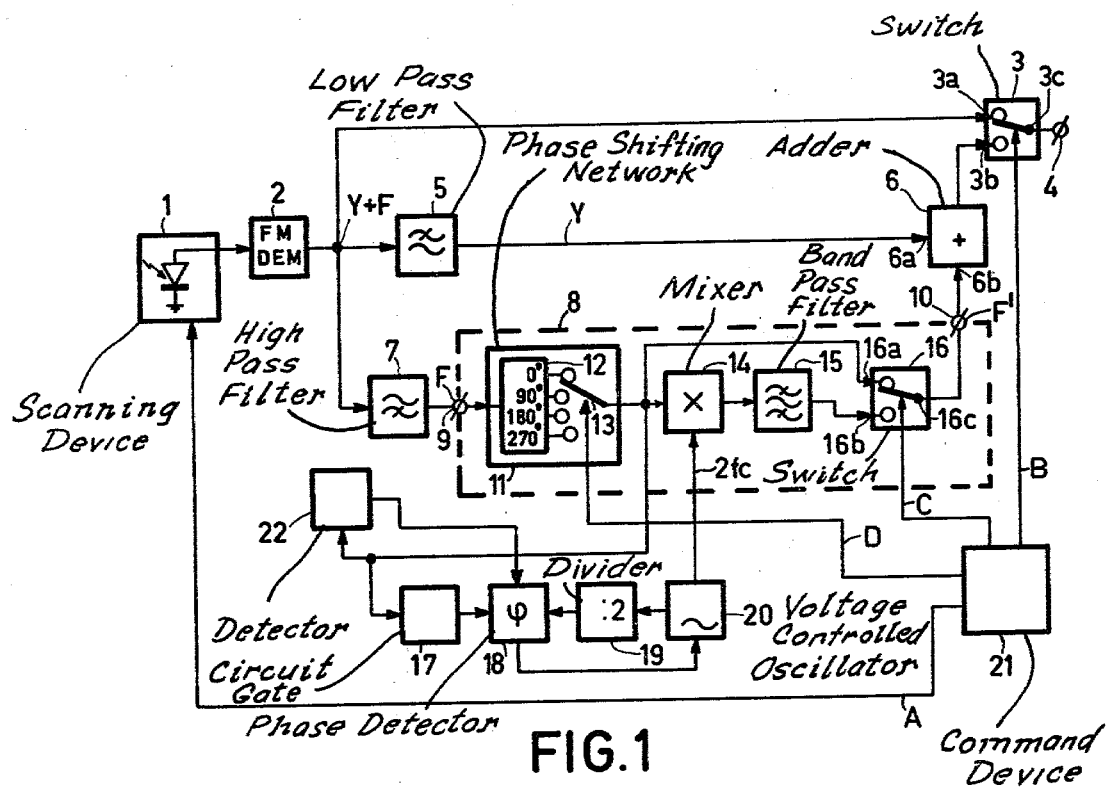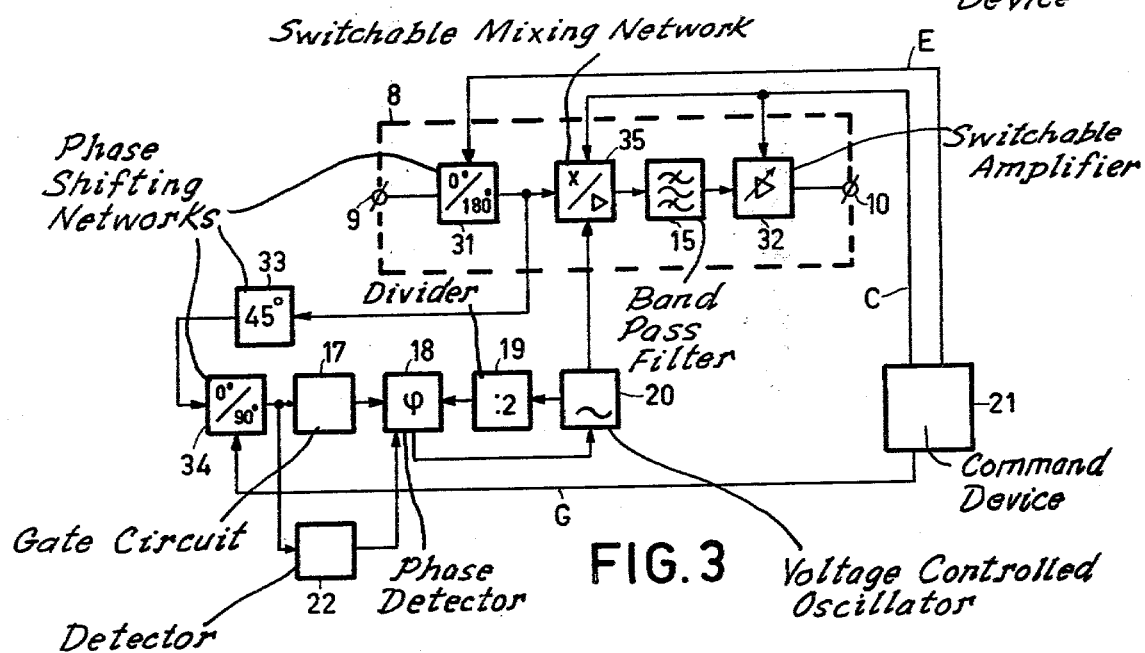

APPARATUS FOR READING A DISC-SHAPED RECORD CARRIER HAVING A PAL COLOR TELEVISION SIGNAL

BRIEF SUMMARY OF THE INVENTION

The invention relates to an apparatus for reading a disc-shaped record carrier, in particular an optically readable record carrier, on which a color television signal is recorded in a plurality of substantially concentric tracks, each track circumference containing one picture of said color television signal. The apparatus is provided with a scanning device for scanning the record carrier, control means for controlling the radial scanning position on the record carrier, a decoding device for converting the signal being read into a standard PAL color television signal, a command device for abruptly changing the radial scanning position on the record carrier by the application of command signals to the control means so as to obtain a changed scanning sequence of the television pictures recorded on the record carrier, and a correction device controlled by the command device. The correction device comprises an input terminal which is coupled to the decoding device so as to receive the chrominance signal, an output terminal for supplying a corrected chrominance signal, and a correction circuit included between these two terminals. The correction circuit is adapted to maintain a chrominance signal on the output terminal which, regardless of the selected scanning sequence of the recorded television pictures, exhibits the line sequential phase alternation which is characterized of a PAL color television signal.

Such apparatus is described in U.S. Pat. No. 4,057,827. As is stated in this patent a disc-shaped record carrier is particularly suitable for realizing deviating scanning modes, such as slow-motion, fast-motion or still pictures. Especially when an optically readable record carrier is used in conjunction with an optical read system the scanning sequence of the recorded television picture can be changed in a simple manner, namely by abruptly changing the scanning position on the record carrier by one or more track distances in the radial direction at preprogrammed instants. In the case of a spiral track a still picture may for example be obtained by moving back the scanning position over one track distance in the radial direction after each revolution of the record carrier, so that the same recorded television picture is continuously read. Conversely, in the case of a record carrier with concentric tracks, such a still picture is obtained by maintaining the radial scanning position constant, whereas for obtaining a "normal" reproduction the scanning position should be advanced over one track distance in the radial direction upon each revolution.

By advancing the scanning position over one track distance once per revolution in the case of a spiral track the scanning speed is doubled, while by thus advancing it several times per revolution a correspondingly higher scanning speed may be realized. In a similar way by moving back the scanning spot by one track distance several times per revolution the scanning sequence of the recorded images may be reversed, the number of movements per revolution again determining the scanning speed. Instead of a movement of the scanning position by one track distance a movement by several track distances may also be realized, if desired.

The desired mode, i.e. the desired scanning sequence of the television pictures recorded on the record carrier, is dictated by the command device, which at selected instants supplies command signals to the control means for changing the radial scanning position. Preferably, these instants are situated within the vertical flyback intervals of the television signal being read, so that the disturbance in the signal being read as a result of the change in scanning position falls outside the picture which is reproduced. The technique of the aforementioned, U.S. patent produces undesirable results if the color television signal recorded on the record carrier is of the PAL standard, at least exhibits the essential characteristics of a standard PAL color television signal, and is converted into such a standard PAL color television signal with the aid of the decoding device. This is for example the case if during recording the composite standard PAL color television signal is frequency modulated on a carrier wave. Frequency demodulation during reproduction then automatically yields a standard PAL color television signal.

As is known the most essential characteristic of a standard PAL color television signal is the line sequential alternation of the phase of the chrominance signal, the so-called PAL phase, produced by the line sequential polarity reversal of the carrier wave of one of the two color difference signals. As a television picture contains an odd number of picture lines, the line sequential alternation of the PAL phase would be disturbed at the transition, for example when a still picture is realized, the last line of a specific television picture being followed by the first line of the same television picture. In the PAL reproducing device to which such a color television signal is applied this would lead to the color reproduction being impaired.

In order to avoid this problem the apparatus in accordance with said Patent comprises a correction device, which is provided with a delay line having a delay time corresponding to one line interval of the television signal. With the aid of a switching device controlled by the command device the chrominance signal of selected television pictures read, which selection is determined by the selected scanning mode and is dictated by the command device, is delayed by an amount equal to one line interval with the aid of the delay line. This step ensures that regardless of the selected scanning mode the line sequential alternation of the PAL phase is maintained.

Although with this known apparatus the object pursued, i.e. maintaining the line sequential alternation of the PAL phase, is achieved in a comparatively simple manner, this may nevertheless lead to a quality deterioration under certain conditions, depending on the picture content. This is caused by the fact that the time correlation between the reproduced luminance signal and chrominance signal is no longer unambiguous. For the selected television pictures the chrominance signal has been delayed by one line interval relative to the luminance signal, while this is not the case for the non-selected television pictures. Especially at a vertical color transition this may give rise to so-called "color jitter".

It is the object of the invention to provide an apparatus of the afore-mentioned type with which said object is also achieved by simple means but said drawback is avoided.

To this end the apparatus in accordance with the invention is characterized in that the correction device is provided with an oscillator circuit for generating a reference signal having a frequency equal to twice the PAL chrominance sub carrier frequency, a mixing circuit included in the correction circuit for mixing the chrominance signal obtained from the input terminal with the reference signal during selected picture intervals dictated by the command device, a filter for extracting a frequency band around the PAL chrominance sub-carrier frequency from the resultant mixed signal and applying this component to the output terminal, and phase correction means for introducing a relative phase shift of 0°, 90°, 180° to 270° between the chrominance signals on the input and the output terminal in accordance with a pattern prescribed by the command device.

With the aid of the correction device the chrominance signal for selected television pictures is taken from the output of the mixing circuit before the output terminal. Since the original chrominance signal applied to the input terminal has been mixed with the reference signal in this mixing circuit, which reference signal has a frequency equal to twice the PAL chrominance sub-carrier frequency, the pattern of consecutive PAL-phases in the resulting mixed signal at the output of the mixing circuit is shifted by one line interval relative to that of the chrominance signal at the input terminal. Thus, by taking the chrominance signal to be reproduced either from the input terminal or the output terminal in accordance with a switching sequence which is also dictated by the command device, a chrominance signal can be obtained which continuously exhibits the desired PAL phase alternation regardless of the selected scanning mode.

It is to be noted that a change of the PAL phase by mixing the chrominance signal with a reference signal of twice the chrominance sub carrier frequency is known per se, for example from Netherlands patent application No. 7000865 and German Offenlegungsschrift No. 2549364. However, neither of these two references described a device in which the correction device is controlled by the command device which dictates the scanning mode. The Netherlands Patent Application relates to a drop-out compensator, in which the chrominance signal is mixed with the said reference signal every time that a delay line with a delay of one line interval is included. The German Offenlegungsschrift inter alia relates to the realization of a still picture in the case of a magnetic tape, but for controlling the correction device a separate detection circuit is used, which detects the PAL phase sequence of the lines being read. The use of such a detection circuit is comparatively expensive and may moreover give rise to undesired complications.

In addition to said correction of the PAL phase the apparatus in accordance with the invention also performs a correction of the phase of the chrominance sub-carrier signal. For a standard PAL color television signal the frequency of the chrominance subcarrier signal is 4,443,618.75 Hz, i.e. $(284 - \frac{1}{4})$ f H $+25$ Hz, where fH is the line frequency. This means that one picture interval does not contain a whole number of periods of said chrominance sub-carrier wave. When the scanning sequence of the recorded pictures is changed this would mean that after every change of the scanning position a phase jump occurs in this chrominance subcarrier wave. In accordance with the invention this is avoided by the inclusion of phase correction means in the correction device. Since on the record carrier one picture is recorded per track circumference the phase shift to be introduced by said phase correction means is always an integral multiple of 90°, thus enabling the required phase shift to be introduced in said phase correction means with the aid of a comparatively simple control circuit in accordance with a pattern which is prescribed by the command device depending on the selected scanning mode.

In order to simplify the correction device a preferred embodiment of the apparatus in accordance with the invention is characterized in that the command device is adapted to supply command signals to the control means for changing the radial scanning position by one track distance and that the phase correction means are provided with a phase shifting network included in the correction circuit for obtaining a relative phase shift of 0° or 180° in accordance with a pattern dictated by the command device, and a phase control circuit for the oscillator circuit for maintaining a reference signal of such a phase that the beginning of each two period interval of said reference signal relative to the beginning of each one-period interval of the chrominance signal is shifted by a quarter period of the reference signal.

In this preferred embodiment the command device has been adapted deliberately to supply only command signals which cause a jump of the radial scanning position over one track distance. It is found that with this limitation of the magnitude of the jump in the radial direction a simple correlation is obtained between the required correction of the PAL phase and the correction of the chrominance sub-carrier phase. It is found in particular that a correction of the PAL phase by the mixing with the reference signal always coincides with a correction of the phase of the chrominance sub-carrier equal to an odd multiple of 90°. The invention makes effective use of this correlation by including a phase shifting network in the correction circuit which produces a phase shift of either 0° or 180°, and by introducing a phase shift of 90° via the oscillation circuit. Thus, all the necessary combinations of PAL phase correction and correction of the chrominance sub-carrier phase can be obtained with a comparatively simple control circuit.

BRIEF DESCRIPTION OF THE DRAWINGS

The invention will be described in more detail with reference to the Figures, in which FIG. 1 shows a first embodiment of the apparatus in accordance with the invention.

FIG. 3 shows a second embodiment of the apparatus in accordance with the invention.

DETAILED DESCRIPTION OF THE PREFERRED EMBODIMENTS

Figure 2:
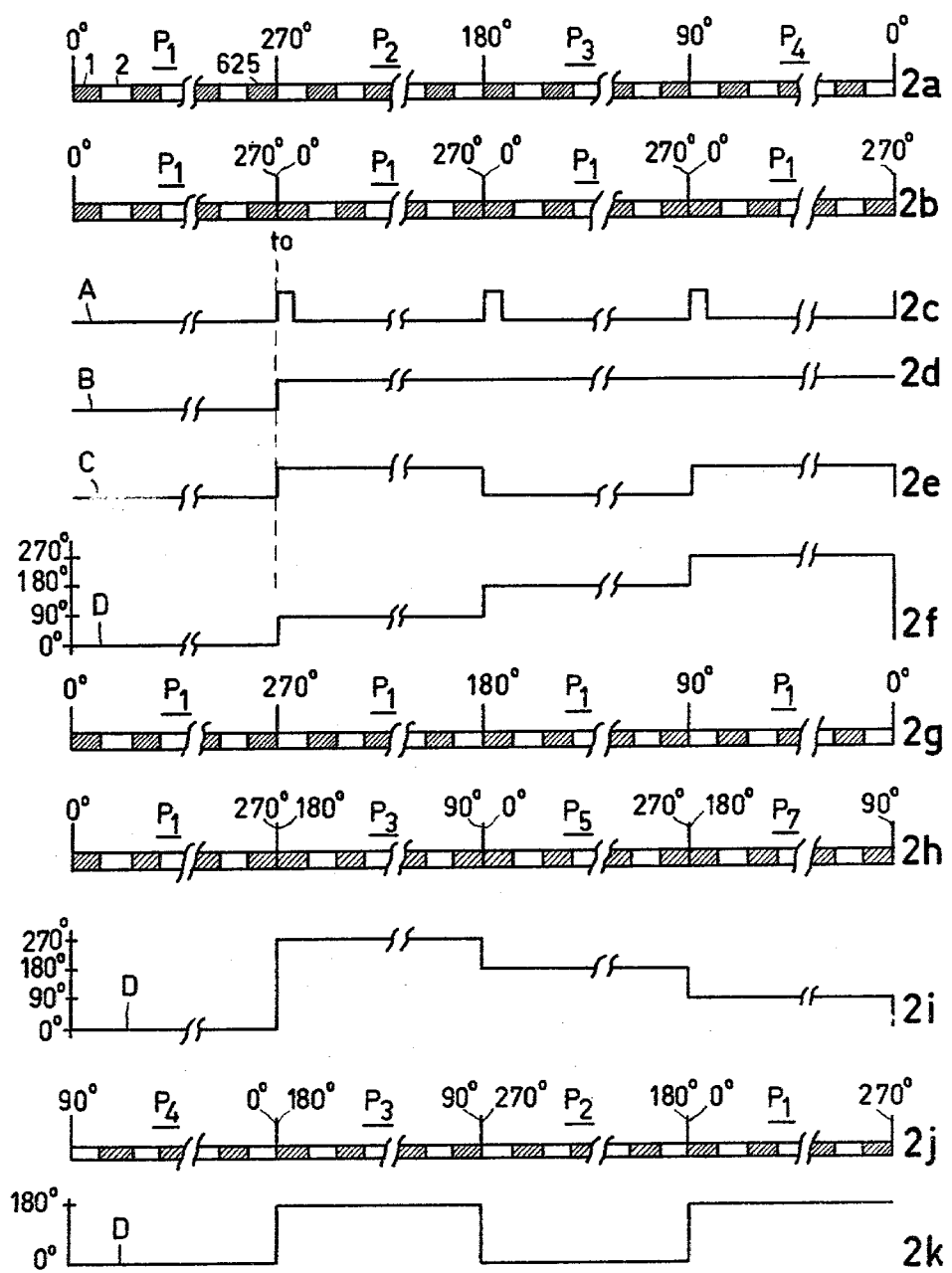
FIG. 2 shows the associated signal waveforms by way of illustration.

FIG. 1 shows a first embodiment of the apparatus in accordance with the invention, the scanning device being schematically represented by the block 1 for the sake of simplicity, because the design of this scanning device in itself is only of subordinate importance for the present invention. Examples of scanning devices and the associated control means, in particular optical scanning devices, are amply known from the literature. As an example reference is made to U.S. Pat. No. 3,854,015, which is incorporated herein by reference.

Although the present invention is by no means limited to the use of a specific signal coding it is assumed that the signal recorded on the record carrier contains a carrier signal which is frequency modulated by a composite standard PAL color television signal. After being read by the scanning device 1 this modulated carrier signal is applied to an FM demodulator 2, which results in a composite standard PAL color television signal Y + F at the output of this FM demodulator 2. This signal Y + F is applied to a first input terminal 3a of a two-way switch 3, whose master contact 3c is connected to an output terminal 4. During the "normal" scanning mode, i.e. when the recorded television pictures are read in the sequence in which they have been recorded, the switch 3 occupies the position shown and consequently the standard PAL color television signal is applied directly from the FM demodulator 2 to the output terminal 4.

During a deviating scanning mode the switch 3 occupies the position not shown, and consequently the input terminal 3b is connected to the output terminal 4. This input terminal 3b is connected to the output of an adder circuit 6, which has an input 6a to which the luminance signal Y is applied, which with the aid of a low-pass filter 5 has been extracted from the composite color television signal Y + F. The input 6b of this adder circuit 6 is connected to the output terminal 10 of a correction circuit 8, which has an input terminal 9 to which the chrominance signal F, which has been extracted from the composite color television signal Y + F with the aid of a high-pass filter 7, is applied. This chrominance signal F is corrected in such a way in the correction circuit 8 that during deviating scanning modes the chrominance signal F' at the output terminal 10 of the correction circuit also complies with the PAL standard, so that also during these scanning modes a standard PAL color television signal is available on the output terminal 4.

The correction circuit 8 first of all comprises a phase-shifting network 11 which is connected to the input terminal 9. This phase-shifting network serves to realize a phase shift of 0°, 90°, 180°, or 270°, the choice of the desired phase shift being dependent on the selected scanning mode. Essentially, the phase shifting network 11 comprises a network 12, which provides the respective phase shifts between its input and four outputs, and a switch 13 which connects one of said four outputs to the output of the phase shifting network 11. This switch 13 is controlled by a command device 21 (control signal D), which also defines the correct scanning mode by applying a control signal A to the scanning device 1 and which also controls the switch 3 (control signal B).

The correction circuit 8 furthermore comprises a mixing circuit 14 which is connected to the output of the phase shifting network 11. The mixing circuit also receives a reference signal $2f_c$, $f_c$ being the chrominance subcarrier frequency. The output of this mixing circuit 14 is connected to an input 16b of a two-way switch 16 via a bandpass filter 15 having a pass-band around the chrominance subcarrier frequency $f_c$. An input 16a of this switch 16 is connected to the output of a phase shifting network 11, while its output 16c is connected to the output terminal 10 of the correction circuit. Depending on the position of the switch 16 the chrominance signal F' on the output terminal 10 is or is not mixed with the reference signal. The switch 16 is also controlled by the command device 21 depending on the selected scanning mode (control signal C).

For generating the reference signal the apparatus comprises a voltage controlled oscillator 20. The frequency of the generated reference signal is divided by two with the aid of a divider stage 19 and subsequently the signal is applied to a phase detector 18. This phase detector 18 receives the burst signals of the chrominance signal on the output of the phase shifting network 11, which burst signals have been keyed out by a gate circuit 17, on a second input and supplies a control signal for the oscillator 20. Moreover, said phase detector receives a control signal from a detector 22, which supplies a squarewave control signal having a frequency $f_h/2$. The function of this control signal will be explained hereinafter. By controlling the oscillator 20 as described via the phase detector 18 the reference signal supplied by the oscillator 20 is locked to the frequency and phase of the burst signal contained in the chrominance signal.

In order to clarify the operation of the apparatus in accordance with the invention reference is made to FIG. 2. When a spiral information track is scanned in accordance with a normal scanning mode the television pictures $P_1$, $P_2$, $P_3$, $P_4$ etc. are read consecutively. This situation is represented in FIG. 2a, the spiral track being as it were unrolled. Each television picture comprises 625 lines, the PAL phase alternating from line to line, which is indicated by the line intervals 1, 2 . . . 625 which are shown hatched alternately. As during recording the PAL phase alternation exhibits a continuous pattern this will also be the case during reproduction in accordance with the normal scanning mode. The same applies to the chrominance subcarrier which continues from picture to picture without any phase transients. Since the frequency of this chrominance subcarrier is not an integral multiple of the line frequency, but differs by $\frac{1}{4} f_H$ therefrom, the initial phase of the chrominance subcarrier differs for consecutive pictures, which initial phase is indicated at the transition of consecutive pictures.

If a record carrier having such a spiral information track is scanned in accordance with a still picture mode, the scanning position is moved back over one track distance upon every revolution, so that each time the same track circumference is scanned, resulting in the consecutive reproduction of the same picture. During the reproduction of the picture $P_1$ in accordance with this mode the pattern of the PAL phase alternation and the chrominance subcarrier phase is then as shown in FIG. 2b. This Figure clearly shows that at each transition from the end of a reproduced picture to the beginning of the same reproduced picture the PAL phase alternation is disturbed, because the first (1) and the last (625) line of a picture always have the same PAL phase. Moreover, it is evident that a phase jump occurs in the chrominance subcarrier signal, because this chrominance subcarrier signal has a phase of 270° at the end of the picture $P_1$ and a phase of 0° at the beginning, which two phases are indicated near the transition between the consecutive pictures.

By means of the apparatus in accordance with the invention both this disturbance of the PAL phase and the disturbance in the chrominance subcarrier signal are corrected. For controlling the correction means use is then made of control signals which are supplied by the command device 21, which command device also controls the radial scanning position so as to realize the desired scanning mode. For the manner in which this radial positional control and jumpwise movement can be realized in for example an optical scanning system reference is made to the said U.S. Pat No. 3,854,015. As described therein the jumpwise change of the radial scanning position is obtained by the application of a suitable pulse-shaped control signal to the relevant deflection element. As is also indicated, the jumpwise movements in the case of a still picture mode are preferably performed during the vertical flyback period, for which a synchronization between the command signals supplied to the control means by the command device and said vertical flyback intervals is necessary, which can be achieved in a simple manner by detection of the vertical flyback pulses in the signal read, which vertical flyback pulses are shown in FIG. 2c. For realizing a still picture a jumpwise backward movement of the radial scanning position over one track distance should be performed during every vertical flyback period. The control pulses A for the scanning device 1 may therefore be assumed to coincide with the vertical flyback pulses, shown in FIG. 2c, the shape of the control pulses being obviously adapted to the deflection element used.

When the still picture mode is switched on a flip-flop in the command device 21 is triggered by the first vertical flyback pulse detected after this (instant $t_O$). The output of this flip-flop supplies the control signal B for the switch 3, so that after said instant $T_O$ this switch 3 connects its output terminal 3c to its input terminal 3b and consequently the chrominance signal for the output terminal 4 is picked-off from the correction device 8.

The command device 21 produces a third control signal C, which is applied to the switch 16. After the still picture mode has been switched on this control signal C changes in logic level upon each jumpwise change of the scanning position, i.e. upon each pulse of the control signal A. As a result of this the switch 16 alternately occupies the two switching positions possible during consecutive scanning periods of the picture $P_1$. This means that during consecutive scanning periods of said picture $P_1$ the chrominance signal supplied by the correction circuit 8 is mixed (second and fourth scan of $P_1$) or not mixed (first and third scan) with the reference signal $2f_c$. As this mixing of the chrominance signal with the reference signal $2f_c$ of a frequency equal to twice the chrominance subcarrier frequency causes the PAL phase to alternate, the result of this switched processing of the chrominance signal is that the chrominance signal on the output terminal 10 again exhibits the desired undisturbed PAL phase alternation as shown in FIG. 2g.

In order to also eliminate the phase transients in the chrominance subcarrier wave the command device generates a fourth control signal D for the switch 12. This control signal D controls the switch 12 in such a way that the phase shift realized by the phase shifting network 11 is switched in accordance with the pattern shown in FIG. 2f between the possible values 0°, 90°, 180° and 270°. Starting from the phase pattern shown in Fig. 2b it is apparent that the addition of these switched phase shifts result in the phase pattern shown in FIG. 2g, from which it is evident that the phase transients between consecutive picture intervals are fully eliminated.

The switching of the PAL phase controlled by the command device 21 and the introduction of the phase shifts in accordance with a pattern which is also dictated by the command device, thus ensure that by comparatively simple means the chrominance signal produced during this still picture mode complies with the PAL standard. If a different scanning mode is selected the control signals should be adapted to this scanning mode, which can again be realized with the aid of the logic circuits, included in the command device 21, for generating these control signals. By way of illustration the chrominance signal read is shown in FIG. 2h in the case that consecutively the recorded pictures $P_1$, $P_3$, $P_5$, $P_7$ etc. is scanned, i.e. a fast-motion scanning mode, which is achieved by advancing the radial scanning position over one track distance after each revolution of the record carrier. In a similar way as for the still picture mode it is evident that for this scanning mode the control signals B and C should be as shown in FIGS. 2d and 2e, while only the control signal D for the switch 12 should have a different shape, i.e. such that the phase shift pattern shown in FIG. 2i is obtained. In a similar way the control signal required for any desired ascanning mode can be derived with the aid of the logic networks included in the command device and operative in the relevant scanning mode. By way of illustration FIG. 2j also shows the situation which arises if consecutively the pictures $P_4$, $P_3$, $P_2$, $P_1$ etc. are scanned, for which after each revolution the radial scanning position should be changed by two track distances, which scanning mode is referred to as the reverse mode. FIG 2j shows that in respect of the PAL phase no correction at all is necessary, so that switch 16 may continuously remain in the position shown. In order to eliminate the phase transients in the chrominance subcarrier signal it suffices to apply a phase correction in accordance with the pattern shown in FIG. 2k with the aid of the phase shifting network 11.

As previously stated the burst signal is extracted from the chrominance signal at the output of the phase shifting network 11 with the aid of the gate circuit 17, which means that this burst signal has also been subjected to the desired phase correction. However, as in a PAL color television signal the phase of the burst signal alternates from line to line an additional correction is necessary in order to obtain a stable reference signal on the output of the oscillator 20. For this purpose a control signal is applied from the detector 22 to the phase detector 18, which detector 22 detects the line synchronizing pulses in the television signal read and derives a symmetrical squarewave control signal with a frequency $f_h/2$ therefrom. The phase detector 18 has provisions to eliminate the irregularity as a result of the line sequential phase alternation of the burst signal in the case of phase comparison of the signals from the gate circuit 17 and the divider 19 by a line sequential phase shift of one of said these signals. Essentially this corresponds to the identification circuit of the demodulator circuit used in a PAL television receiver. For the gate circuit 17, the phase detector 18, the divider 19 and the oscillator 20 a part of the relevant integrated circuit, for example of the type TDA 2520, may be ued. As an alternative the IC type TDA 2720, may be used.

As the chrominance signal on the output of the phase shifting network 11 has not yet been corrected in respect of the PAL phase, there will be a non-corrected phase jump at a picture transition in a non-standard scanning mode if the oscillator is driven by the burst signal. By selecting the time constant of the identification circuit (detector 22) sufficiently small, the reference signal is readjusted to its stable value before the end of the vertical flyback period, so that the reproduced picture is not disturbed. Alternatively, it is possible to shift the control signal supplied by the detector 22 by half a period upon every jumpwise change of the scanning position, for which purposes for example the control signal C may be applied from the command device 21 to the detector 22.

FIG. 3 shows a second embodiment of the correction device, corresponding elements bearing the same reference numerals as in FIG. 1. Instead of the phase shifting network 11 the correction circuit 8 now comprises a phase shifting network 31, which depending on a control signal E introduces a phase shift of 0° or 180°. The drive circuit for the oscillator 20 now includes a phase shifting network 33 which introduces a phase shift of 45° in the burst signal which is eventually applied to the phase detector 18. This phase shift results in a phase shift of 90° in the reference signal supplied by the oscillator 20.

This embodiment is based on the recognition that if each time a jumpwise change of the scanning position by one track distance is effected, a phase shift of 90° or 270° to be introduced in the chrominance signal is always attended by a mixing of said chrominance signal with the reference signal, while in the case that a phase shift of 0° or 180° is required no mixing takes place. This means that for these scanning modes it is possible to obtain both the desired phase shifts and the desired PAL phase alternations by including a phase shifting network 31 which is switchable between 0° and 180° in the correction circuit and by introducing a continuous 90° phase shift in the reference signal. To ensure moreover that no phase transients occur in the drive of the oscillator 20, as a result of which said phase-controlled oscillator would have to be corrected continually, the drive circuit includes a phase shifting network 34 which depending on a control signal G introduces a phase shift of 0° or 90°.

Figure 4:
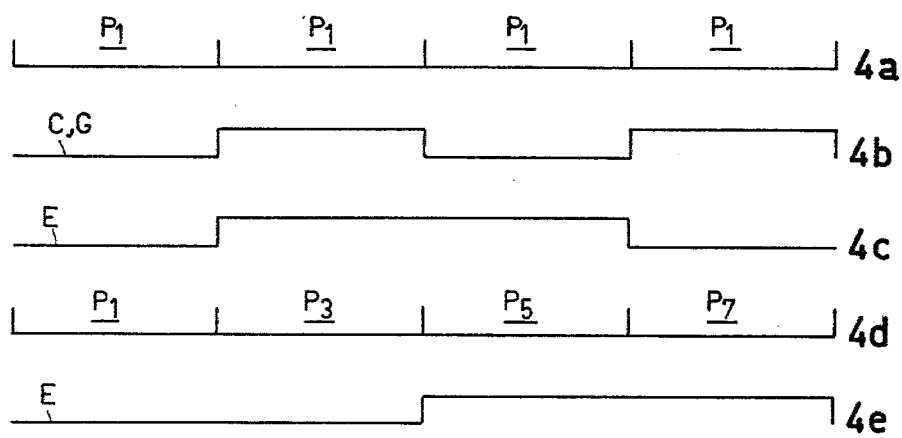
FIG. 4 shows the associated signal waveforms.

By way of illustration FIG. 4b and FIG. 4c show the pattern of the control signals E and G for the still picture mode which is schematically represented in FIG. 4a, a logic "1" of the control signals always implying that the greater of the two possible phase shifts is realized by the relevant phase shifting network. For the fast-motion scanning mode, which is schematically represented in FIG. 4d, the control signals C and G shown in FIG. 4b may be used in unmodified form, while for the control signal E the pattern of FIG. 4e is required.

Figure 5:
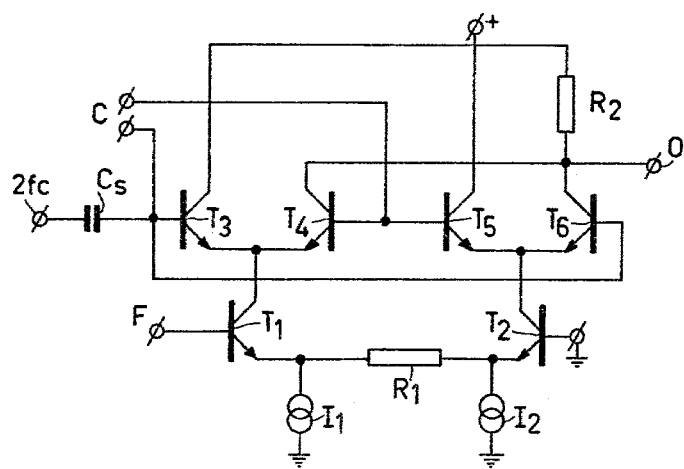
FIG. 5 finally shows a modulator circuit for use in the apparatus in accordance with the invention.

In contradistinction to the embodiment shown in FIG. 1 the correction device of FIG. 3 does not comprise a separate switch 16, but the mixing circuit 35 is switchable, so that said mixing circuit 35 depending on the control signal C functions as amplifier or as mixing circuit. A version of such a switchable mixing circuit is shown in FIG. 5.

The mixing circuit shown in said Figure comprises a first differential stage with the transistors $T_1$ and $T_2$, whose emitters are interconnected via a resistor $R_1$ and are also connected to a current source $I_1$ and $I_2$ respectively. The chrominance signal F is applied to the base electrode of transistor $T_1$, while the base electrode of transistor $T_2$ is at a reference potential. The collector electrode of transistor $T_1$ is connected to the common emitters of the transistors $T_3$ and $T_4$, which together constitute a second differential stage, while the collector of transistors $T_2$ is connected to the common emitters of the transistors $T_5$ and $T_6$, which together constitute a third differential stage. The base electrodes of the transistors $T_4$ and $T_5$, as well as those of the transistors $T_3$ and $T_6$, are interconnected. The collectors of the transistors $T_4$ and $T_6$ are connected to a collector resistors $R_2$ and constitute the output terminal O of the circuit, while the collectors of the transistors $T_3$ and $T_5$ are connected to the positive supply terminal. The reference signal $2f_c$ is applied to the base electrodes of transistors $T_3$ and $T_6$ via an isolating capacitor $C_s$.

The operation of the circuit shown on the d.c. level on the base electrodes of the transistors $T_4$ and $T_5$ relative to that on the base electrodes of the transistors $T_3$ and $T_6$, to which the control signal C is applied. If the d.c. level on the base electrodes of the transistors $T_4$ and $T_5$ is higher than that on the base electrodes of the transistors $T_3$ and $T_6$, transistors $T_4$ and $T_5$ are conductive and the chrominance signal supplied by the first differential stage (transistors $T_1$ and $T_2$) is transferred directly, i.e. without mixing, to the output terminal O. However, if the d.c. level on the base electrodes of the transistors $T_4$ and $T_5$ is equal to that on the base electrodes of the transistors $T_3$ and $T_6$, transistors $T_3$, $T_6$ and $T_4$, $T_5$ conduct alternately depending on $2f_c$ and the chrominance signal F is mixed with the reference signal $2f_c$.

As for both possible functions of this switchable mixing circuit the gain factor may differ, a switchable amplifier 32 is included in the apparatus in accordance with FIG. 3, which is also controlled by the control signal C and which compensates for the changing gain factor of the mixing circuit. The advantage of the use of this circuit, which functions as mixing circuit or amplifier, resides in the fact that the chrominance signal is always passed through the same circuit and automatically is then subject to the same response.

In the embodiment of FIG. 1 this is not the case. In order to obtain the same response in this embodiment a delay element can be included in the direct path from the phase shifting network 11 to the input 16A of the switch 16, which element introduces a delay equal to that of the mixing circuit 14, while moreover a bandpass filter identical to the filter 15 can be included.

For the same reason the circuit between the filter 15 and the switch 6 and between the FM demodulator 2 and input 3a of the switch 3 generally includes delay elements in order to ensure that the various signal components on the output terminal are in time-synchronism.

It will be evident that the invention is by no means limited to the embodiments shown in the Figures. The required control signals can be generated in manners which are obvious to those skilled in the arts using logic circuits or, if desired, using a programmable processor. Moreover, the operation of the apparatus may be further refined. As an example, it is desirable to terminate a non-standard scanning mode at an instant at which no mixing of the chrominance signal is effected and the phase shift introduced in the correction circuit is 0°. This it is achieved that at the instant that as a result of the change-over of the switch 3 the standard scanning mode is restored no disturbance occurs in the chrominance signal. In order to achieve this is it suffices to lock the control signal B required for switching over the switch 3 in the command unit to the control signals C and D, i.e. not to transfer the control signal B via an AND gate until the control signals C and D both have the appropriate values.

What is claimed is:

1. An improved apparatus for reading a disc-shaped record carrier, in particular an optically readable record carrier, on which a color television signal is recorded in a plurality of substantially concentric tracks, each track circumference containing one picture of said color television signal, which apparatus is provided with a scanning device for scanning the record carrier, control means for controlling the radial scanning position on the record carrier, a decoding device for the conversion of the signal being read into a standard PAL color television signal, a command device for abruptly changing the radial scanning position on the record carrier by applying command signals to the control means so as to realize a changed scanning sequence of the television pictures recorded on the record carrier, and a correction device controlled by the command device, which correction device comprises an input terminal which is coupled to the decoding device so as to receive the chrominance signal, an output terminal for supplying a corrected chrominance signal, and a correction circuit included between these two terminals, which correction circuit is adapted to maintain a chrominance signal on the output terminal which, regardless of the selected scanning sequence of the recorded television pictures, exhibits the line sequential phase alternation which is characteristic of a PAL color television signal, the improvement being characterized in that the correction device is provided with an oscillator circuit for generating a reference signal having a frequency equal to twice the PAL chrominance subcarrier frequency, a mixing circuit included in the correction circuit for mixing the chrominance signal obtained from the input terminal with the reference signal during selected time intervals dictated by the command device, a filter for extracting a frequency band around the PAL chrominance subcarrier frequency from the resulting mixed signal and applying this component to the output terminal, and phase correction means for introducing a relative phase shift of 0°, 90°, 180°, or 270° between the chrominance signals on the input and the output terminal in accordance with a pattern prescribed by the command device.

2. An apparatus as claimed in claim 1, characterized in that the command device is adapted to supply command signals to the control means for changing the radial scanning position by one track distance, and that the phase correction means are provided with a phase shifting network included in the correction circuit for obtaining a relative phase shift of 0° or 180° in accordance with a pattern dictated by the command device, and a phase control circuit for the oscillator circuit for maintaining a reference signal of such a phase that the beginning of each two-period interval of said reference signal relative to the beginning of each one-period interval of the chrominance signal is shifted by a quarter period of the reference signal.

3. An apparatus as claimed in claim 1 or 2, characterized in that the mixing circuit comprises a modulator circuit, having a first input to which the chrominance signal is applied and a second input to which the reference signal is applied, while said second input also receives a control signal which may have a first and a second value, the modulator circuit operating as amplifier for the chrominance signal when said control signal has the first value and operating as mixing circuit when said control signal has the second value.

* * * * *